(12) United States Patent
Hartman et al.

(10) Patent No.: US 7,078,451 B2
(45) Date of Patent: Jul. 18, 2006

(54) FORMULATION AND PROCESS FOR COMPRESSION MOLDED COMPONENT PARTS

(75) Inventors: David R. Hartman, Granville, OH (US); James Priest, Nashport, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 420 days.

(21) Appl. No.: 10/326,003

(22) Filed: Dec. 19, 2002

(65) Prior Publication Data

US 2004/0122148 A1   Jun. 24, 2004

(51) Int. Cl.
*C08K 3/10*   (2006.01)
(52) U.S. Cl. ............... 524/394; 523/514; 524/432; 524/436
(58) Field of Classification Search ........ 523/514; 524/394, 432, 436
See application file for complete search history.

(56) References Cited

U.S. PATENT DOCUMENTS

| 4,128,601 A | 12/1978 | McCluskey |
| 5,491,184 A | 2/1996 | McBain et al. |
| 5,498,763 A | 3/1996 | McGarry et al. |
| 5,712,036 A | 1/1998 | Piret |
| 5,747,607 A | 5/1998 | Hager et al. |
| 5,853,645 A | 12/1998 | Seats et al. |
| 6,024,908 A | 2/2000 | Koncelik |
| 6,025,073 A | 2/2000 | Piret |
| 6,225,380 B1 * | 5/2001 | Pezron et al. ............... 523/516 |
| 6,228,918 B1 | 5/2001 | Hardebeck |
| 6,369,157 B1 | 4/2002 | Winckler et al. |
| 6,420,047 B1 | 7/2002 | Winckler et al. |

* cited by examiner

*Primary Examiner*—Edward J. Cain
(74) *Attorney, Agent, or Firm*—Inger H. Eckert; Maria C. Gasaway

(57) ABSTRACT

A formulation for controlling the thickening profile for sheet molding compositions to a lower viscosity for use in low pressure molding conditions is provided. The B side addition of a modified alkaline earth oxide thickening system using a combination of oxides results in a sheet molding compound that is tack free at lowered viscosities. These sheet molding compounds exhibit extended shelf lives, good flowability, and excellent handling characteristics.

30 Claims, No Drawings

FORMULATION AND PROCESS FOR COMPRESSION MOLDED COMPONENT PARTS

TECHNICAL FIELD AND INDUSTRIAL APPLICABILITY OF THE INVENTION

The present invention relates generally to sheet molding compounds for use in molded component parts, and more particularly to a sheet molding compound having a reduced viscosity and improved shelf life which can be used in a low pressure compression molding process with lowered cost and improved capabilities such as increased flow, capabilities for molding parts with decreased thickness, capabilities of molding parts of greater size, and improved impact resistance to produce complex component parts.

BACKGROUND OF THE INVENTION

Molded component parts are commonly formed using sheet molding compounds or compositions (SMC) for automotive and building construction and finishing applications. For example, reinforced plastic doors formed by compression molding sheet molding compounds offer several advantages and attributes over typical wood or steel door in that they do not crack or warp over time, they withstand adverse weather, they do not dent easily, and they are generally lower in maintenance. Typically, such doors are molded and assembled with a wood frame and a polyurethane foam core of SMC.

Sheet molding compositions typically include unsaturated polyester or vinyl-ester resins, thickening agents, and a monomer such as styrene to copolymerize the unsaturated polyester during curing in the molding process. Typically, sheet molding compositions contain 20–25% by weight glass fiber reinforcement and 10–40% by weight of an inert filler material, e.g., calcium carbonate. Additionally, sheet molding compositions commonly contain thermoplastic polymers which are added to prevent undesirable shrinkage.

Initially, the sheet molding composition has a viscosity of about 20,000 to 40,000 centipoise, i.e., low viscosity, sticky liquids. This low viscosity provides good wetting of the glass fibers. However, the sheet molding compositions must be brought to a significantly higher viscosity to ensure ease of handling and proper flow of the composition into heated molds for curing during the molding process. Typically, the thickening or maturation process includes mixing the polyester resin with thickening agents such as alkali metal oxides and hydroxides that react or complex with the polyester resin. The maturation time is ordinarily from 3 to 5 days to reach the desired molding viscosity. During that time, the viscosity of the sheet molding composition increases such that the material may be handled by the mold operators. At this point, the viscosity is approximately 25–60 million centipoise. However, over time, the sheet molding composition continues to thicken and therefore has a limited shelf life, usually only 10 to 14 days from manufacturing. If the sheet molding composition is not used within this time, the viscosity increases to a point that the sheet molding composition cannot be used and must be discarded.

In compression molding, a hydraulic press provides high pressure and elevated temperatures to soften the hardened sheet molding composition so that it can flow into the mold cavity. However, because of the extremely high pressures associated with compression molding, e.g., 1,000–2,000 psi, the dies must be formed of forged tool steel, which is very expensive. Therefore, a large capital investment is required for the press and molds.

Additionally, in the past, reduced viscosity sheet molding compounds with appropriate handling characteristics have been achieved by using either crystalline polyesters or isocyanates to impart the thickening of the compound. Crystalline polyesters are heated and applied to the sheet molding compound paste formulation. After they have cooled, they increase the viscosity of the molding compound to a level where handling and processing is possible.

Once placed in the heated mold, the crystalline polyesters return to their reduced viscosity state, thereby rendering a low viscosity effect of the sheet molding compound. These crystalline polyesters are typically thermoplastic and, as such, can act as a low profile agent. However, crystalline polyesters are typically quite expensive compared to traditional thickening agents. Further, the necessary heating and controlled cooling of the SMC paste can lead to an increased demand for capital in the compounding operation, difficulty in wetting out the reinforcement it the SMC cools too rapidly, and other issues related to the inability of the SMC paste to evenly distribute the reinforcing fibers during the flow portion of molding if the hot viscosity of the paste is not enough to move the fibers.

In the case of isocyanate thickening of a sheet molding compound, isocyanates such as methylene diisocyanate or toluene diisocyanate are added to an SMC formulation in the last moment prior to compounding. The isocyanate groups bond to the hydroxide end groups of the polyester to form a urethane cross link to effectively thicken the SMC. In the case of a pure, unmodified vinyl-ester based SMC, the addition of a glycol or polyol group may be necessary to effectively thicken the sheet molding compound. While this urethane linkage tends to toughen the molded SMC part and may act as an additional low shrink additive, it has several detracting features. First, shelf life on a sheet molding compound thickened with isocyonate or a polyol group is typically less than 10 days from time of compounding. Secondly, isocyanates cause a sensitizing reaction in humans. Therefore, they must be strictly contained during storage and mixing and high levels of ventilation must be used during compounding in order to prevent allergic type symptoms including rash or skin outbreaks or difficulty or stoppage of breathing. Even with such measures taken and strictly adhered to, some individuals still will not be able to work around compounds containing these chemicals due to their hypersensitivity.

It is therefore desirable to provide a method for controlling the flow characteristics of the sheet molding compound to a lower viscosity which can be used in low pressure molding conditions such that the disadvantages of the prior art are overcome.

SUMMARY OF THE INVENTION

Accordingly, an important object of the present invention is to provide a formulation and method for controlling the thickening profile for the sheet molding composition to a lower viscosity so that low pressure molding conditions can be utilized.

It is another object of the present invention to improve the handling characteristics and increase the amount of time that the sheet molding compound maintains a useful lower viscosity.

It is a further object of the present invention to reduce the workable viscosity to improve flow and air exclusion characteristics, which leads to a reduction in defects such as blisters and non-mold fills.

It is a feature of the present invention that the molding process time and temperature are optimized with the catalyst for flow without resin degradation to reduce mold cycle time with reduced vitrification or premature gellation.

It is a feature of the present invention that the sheet molding compound is less sensitive to temperature variation across the surface of the mold, moisture level control, and filler and pigment particle size variations.

It is another feature of the present invention that improvements of a lowered viscosity sheet molding compound include a fiber bundle geometry and sizing that is readily wettable and soluble.

It is a further feature of the present invention that the rate of dissolution of the lowered viscosity sheet molding compound reduces the time to fill the mold in the compound shear viscosity.

It is yet another feature of the present invention that the shelf life of the sheet molding compound is increased.

It is another feature of the present invention that composite doors formed from the sheet molding compound can have reduced skin thickness and still meet impact and mechanical performance criteria.

It is an advantage of the present invention that handling characteristics of the sheet molding composition are improved at a lower viscosity, which allows for a more efficient use of the sheet molding compound and less waste of the sheet molding compound.

It is a further advantage of the present invention that a manufacturer has a longer time to work with the lower viscosity sheet molding compound, which leads to a reduction in waste of unmolded sheet molding compound.

It is another advantage of the present invention that cost and manufacturing time are lowered due to the reduction in waste of the unmolded sheet molding compound and the reduction of defects in the molded components.

It is yet another advantage of the present invention that a sheet molding compound having a reduced viscosity and increased flow capacity permits the molding of parts with larger surfaces, deeper draws, ribs or bosses of reduced thickness with increased rates of first quality parts.

It is a further advantage of the present invention that composite doors formed from the sheet molding compound have improved durability and weatherability.

It another advantage of the present invention that the sheet molding compound provides an enhanced design capability for composite doors, sidelights, transoms, lower volume automotive parts, construction installation and finishing parts, and parts requiring a high flow due to their extremely large size.

These and other objects, features, and advantages are accomplished according to the present invention by providing a low viscosity sheet molding compound that is capable of being compounded by traditional methods, is easily handled and processed at lower viscosities, and has the capability to evenly distribute glass while flowing to fill the surface of the molded part.

The foregoing and other objects, features, and advantages of the invention will appear more fully hereinafter from a consideration of the detailed description that follows.

DETAILED DESCRIPTION AND PREFERRED EMBODIMENTS OF THE INVENTION

The present invention solves the aforementioned disadvantages and problems of the prior art by providing a sheet molding compound with improved flow characteristics, i.e., lowered viscosity, that can be used in low pressure molding processes (e.g., from 100 to 2000 psi). The term sheet molding compound is used interchangeably with the acronym SMC herein.

It is noted that parts per hundred resin is a system used by SMC formulators, which bases everything on the amount of resin in a formulation. The resin content determines how much of every other ingredient can and will be used. For example, in Table 1 set forth below, AOC 341-601 and the M571 combine to make up the total resin content for the system. Therefore, the weight of these two ingredients (6306.01 grams) makes up 100% of the resin for the system or 100 PHR. 1 PHR is $1/100^{th}$ of the weight of the total resin weight and is the unit used to make up the rest of the formulation. In this example shown in Table 1, 1 PHR is 63.0601 grams. Thus, the amount of filler needed is 187 PHR and for this batch 187 PHR was 11792.24 grams.

The improved sheet molding compound of the present invention offers many advantages. For example, at this lower viscosity, the shelf life of the SMC is substantially increased. Unlike the prior sheet molding compounds which have to be discarded after 6–10 days, the sheet molding compound according to the present invention can be stored and used at a later time, thereby resulting in reduced waste. SMC formulations according to the present invention may be stored for up to 30 to 90 days, depending upon the application in which it is to be used, storage conditions, the type of resin and catalyst used and inhibitor levels. In addition, the SMC maintains the low viscosity for an extended period of time, thus giving a manufacturer or molder a longer period of time to work with and use the SMC once it is produced. This also leads to a reduction in waste of umnolded SMC.

Reducing the workable viscosity also leads to improved flow and air exclusion characteristics, resulting in a reduced number of defects in molded components such as blisters and non-mold fills where the component parts are unacceptable for sale or reworking. The manufacturer benefits greatly from improved conversion efficiencies of all the raw materials without increasing labor costs or capital costs.

Another added benefit of working with a SMC of reduced viscosity and increased flow capability is that parts with larger surfaces, deeper draws, and ribs or bosses with reduced thickness can be manufactured. It also permits enhanced design capability for items such as composite doors, sidelights, transoms, lower volume automotive parts, automobile chassis parts, surface skins, and large construction related parts such as bath tubs, showers, and wall surround panels. In addition, SMC permits a reduction in door skin thickness while still meeting impact and mechanical performance criteria.

The sheet molding compound according to the present invention contains unsaturated polyester or vinylester thermosetting resins, a thermoplastic component, filler, a monomer to copolymerize the unsaturated resin, free radical generating catalysts, zinc oxide, and calcium hydroxide. It can also optionally include various ingredients such as pigments or additives to improve cure, wet out of reinforcements, etc.

In conventional systems, zinc oxide and calcium oxide are not used as thickeners because their reactivity is not enough to facilitate the levels and rates of thickening required by conventional thickening standards. However, the present inventors have surprisingly discovered that when zinc oxide and calcium oxide are used in conjunction with each other, they provide a thickened SMC at a significantly decreased viscosity that is handleable and processable and which provides some unique and improved characteristics, such as those described herein.

In particular, the sheet molding compound of the present invention contains 40 to 100 parts per hundred resin of a resin, typically a polyester or vinyl-ester resin, preferably 50 to 70 parts per hundred resin, 0.25 to 10 parts per hundred resin of a free radical generating catalyst chosen for the appropriate molding temperature, preferably 1 to 2 parts per hundred resin, 1 to 20 parts per hundred resin of a mold release agent, preferably 3 to 10 parts per hundred resin, and 100 to 300 parts per hundred resin of a filler material, preferably 150 to 250 parts per hundred resin. It can also optionally include 0 to 20 parts per hundred resin of divinyl benzene, preferably 0 to 10 parts per hundred resin, 0 to 60 parts per hundred resin of a thermoplastic low shrink additive, preferably 25 to 40 parts per hundred resin, 0 to 20 parts per hundred resin of a pigment, preferably 9 to 13 parts per hundred resin, 0 to 1 part per hundred resin of an inhibitor matched for storage and molding temperatures that will be used, preferably 0.1 to 0.5 parts per hundred resin, 0.1 to 10 parts per hundred resin of zinc oxide, preferably 1 to 5 parts per hundred resin, and 0 to 10 parts per hundred resin of calcium hydroxide, preferably 1 to 5 parts per hundred resin. Of course, each SMC formulation is tailored to meet the specific needs of the particular application.

Suitable examples of the polyester or vinyl-ester resin include, but are not limited to, P-341 or E-903 polyesters from AOC, Dow Derkane 790 from Dow Chemical, and Phase Alpha, Phase Epsilon and SMC Lite Resins from Ashland Chemical. Suitable examples of the thermoplastic low shrink additive include, but are not limited to, E-540, M 571 and T-181 from AOC, LP-90 and LP40 from Union Carbide, Hycar Rubber from B.F. Goodrich, and Polylite 31701 and 31705 resins from Reichhold. Suitable examples of the free radical generating catalyst include, but are not limited to, terbutyl perbenzoate (TBPB), Atofina MC, and Percadox K-90. Suitable examples of the mold release agent include, but are not limited to, zinc stearate, calcium stearate, and stearic acid. Suitable examples of the pigments include, but are not limited to, titanium dioxide, ferrous oxide, ferric oxide, carbon, zinc sulfite, lead and phthalo compounds. Typically, these pigments are dispersed in a non-thermosetting carrier resin prior to addition into the SMC formulation. Suitable examples of the inhibitors include, but are not limited to, parabenzoquinone (PBQ), hydroquinone (HQ), toluhydroquinone (THQ), tert butyl hydroxyanisol (BHA), and butylated hydroxytoluene (BHT). Fillers commonly used in the SMC include calcium carbonate, alumina trihydrate, clay, wood and nut shell flour, ground or milled glass, recycled composite materials, plastic or glass spheres, and other powderable minerals (e.g., slate, shale, iron, aluminum, brick powder, ceramic powder, etc.). Representative SMC formulations are set forth in Tables 1–3.

TABLE 1

| Ingredients | Phr | Weight | Comments |
| --- | --- | --- | --- |
| AOC 341–601 | 65.1 | 4105.21 | A-side |
| AOC - M571 | 34.9 | 2200.8 | A-side |

TABLE 1-continued

| Ingredients | Phr | Weight | Comments |
| --- | --- | --- | --- |
| Atofina MC | 1.5 | 94.59 | A-side |
| Cal Stearate | 2.27 | 143.15 | A-side |
| Microthene | 2.4 | 151.34 | A-side |
| Hubercarb W-4 | 187 | 11792.23 | A-side |
| Divinyl Benzene | 6 | 378.36 | B-side |
| RP-510 | 7 | 441.42 | B-side |
| Zinc Oxide | 2.5 | 157.65 | B-side |
| Calcium Hydroxide | 1 | 63.06 | B-side |
| Zn Stearate | 1.6 | 100.9 | B-side |
| Pigment | 12.4 | 781.94 | B-side |
| PBQ | 0.0055 | 0.35 | B-side |
| Water | | | Make up to 0.2% - Measured 0.13% |
| 9.61 to 1 A to B Ratio | | 323.6755 PHR total | 63.06 g/phr |

TABLE 2

| Ingredients | Phr | Weight | Comments |
| --- | --- | --- | --- |
| AOC 341–601 | 65.1 | 4124.32 | A-side |
| AOC - M571 | 34.9 | 2211.04 | A-side |
| Atofina MC | 1.5 | 95.03 | A-side |
| Cal Stearate | 2.27 | 143.81 | A-side |
| Microthene | 2.4 | 152.05 | A-side |
| Hubercarb W-4 | 187 | 11847.14 | A-side |
| Divinyl Benzene | 6 | 380.12 | B-side |
| RP-510 | 7 | 443.48 | B-side |
| Zinc Oxide | 1 | 63.35 | B-side |
| Calcium Hydroxide | 1 | 63.35 | B-side |
| Zn Stearate | 1.6 | 101.37 | B-side |
| Pigment | 12.4 | 785.59 | B-side |
| PBQ | 0.0055 | 0.3484 | B-side |
| Water | | | Make up to 0.2% - Measured 0.13% |
| 10.11 to 1 A to B Ratio | | 322.1755 PHR total | 63.35 g/phr |

TABLE 3

| Ingredients | Phr | Weight | Comments |
| --- | --- | --- | --- |
| AOC 903–300 | 71.6 | 4295.16 | A-side |
| AOC T181 | 28.4 | 1703.67 | A-side |
| Cal Stearate | 1.75 | 104.98 | A-side |
| Atofina MC | 1.5 | 89.98 | A-side |
| Hubercarb W-4 | 199 | 11937.66 | A-side |
| Divinyl Benzene | 6 | 359.93 | B-side |
| RP-510 | 7 | 419.92 | B-side |
| PBQ | 0.0001 | 0.06 | B-side |
| Zinc Oxide | 1.75 | 104.98 | B-side |
| Calcium Hydroxide | 1.75 | 104.98 | B-side |
| Zn Stearate | 1.4 | 83.98 | B-side |
| Pigment | 20.1 | 1205.76 | B-side |
| Water | | | Make up to 0.2% - Measured 0.105% |
| 7.95 to 1 A to B Ratio | | 340.2501 total PHR | 59.99 g = 1 PHR |

In a production environment, the polyester or vinylester resin, low shrink additive, catalyst, filler, divinyl benzene, and part of the mold release agent are mixed to form an A-side premix while the pigment, inhibitor, zinc oxide, calcium hydroxide and the remainder of the mold release agent are mixed to form a B-side premix. The A-side and B-side premixes are combined immediately before compounding in the appropriate ratio so as to control the start timing of the thickening reaction and help with automation and continuous running. The addition of the modified alkaline earth oxide thickening system through B-side addition results in a tack free sheet at lowered viscosities.

The thickening reaction begins as soon as the thickening agents come in contact with the thermosetting resin. The rate of this reaction varies with the temperature of the mixture, the moisture available, and the components used. The most simple method to control the rate of reaction is batch mixing, which matches the time required to consume a batch. In particular, in batch mixing, the A-side and B-side are mixed together in an amount that can be consumed and processed. Once a batch is consumed a new one is mixed to take its place. An alternative method to control the rate of reaction is static mixing. In this method, the A-side and B-side are mixed individually and stored in separate tanks. They are then pumped in the correct ratio to a static mixing device immediately before application to the SMC line. This method has the advantage that the material being used in the SMC manufacturing is as fresh as possible, and therefore has a more controlled viscosity giving consistent processing and reinforcement wetting abilities.

The manufacture of the sheet molding compound is a simple process in which a thin polymer film is drawn through a bath of a premanufactured paste under a metering blade which limits the amount of paste which is deposited onto the film. The premanufactured paste is a mixture of thermosetting resins, fillers, and additives designed to render the appropriate properties to the finished part. The film then proceeds through a machine where reinforcements are introduced. The reinforcements are typically chopped fiberglass which is chopped immediately before application to the layer of paste on the glass. The reinforcement could also include pre-chopped reinforcements, mats, veils, or fabrics of reinforcements, linear reinforcements, or flakes of reinforcements. The reinforcement is preferably glass fibers but could also be selected from the following: natural fibers, carbon fibers, and aramid or other polymer fibers.

After the placement of the reinforcements, another film containing an SMC paste is formed on top of the reinforcement layer with the paste side against the reinforcement and the dry film side out. This film is formed in the same manner as the first film layer. Once this "paste and resin sandwich" is formed, the combination is worked or compacted in order to facilitate better saturation or wetting out of the reinforcement by the paste. This saturation leads to improved physical properties of the molded composite part. After the compaction step, the SMC is then taken up in the form of a roll or laid into boxes in an alternating fold type formation called a festoon.

Once collected, the SMC is stored for 1 to 4 days while the chemical thickening reaction takes place. The thickening is usually accomplished in a controlled environment between 75 and 100° F. During this period, the viscosity of the SMC is closely monitored by measuring the viscosity of a retained paste sample from the batch. Once the SMC reaches the desired viscosity for its molding, the SMC is brought out of storage and delivered to a press, where it is cut to a charge of the appropriate size shape and weight for the part to be molded. Next, it is placed in the appropriate position on the matched metal heated mold. The press then closes the mold and curing of the SMC occurs under a reduced pressure, typically from 100 to 2000 psi. After a predesignated curing time, typically between 0.5 and 3 minutes, the press reopens and the cured SMC part is removed, checked for quality, deflashed, and sent on for any further processing such as painting or assembly with other parts that may be required.

Modifications made to the fiber bundle count, fiber diameter, and sizing type can have a dramatic effect on the wettability of the glass fiber reinforcement in an SMC (e.g., a greater or improved ability to saturate the reinforcement). Slight changes such as changing the fiber diameter from 8 to 20 microns and the bundle count from 30 to 200 bundles dramatically effect surface area and can either improve or detract from wettability. The SMC according to the present invention is readily wettable. The wettability of the glass is affected by the solubility of the size on the glass in the resin system and the fiber diameter, bundle count, and glass composition of the glass to be used. For products according to the present invention, the following order is correct for wettability and thereby pigmentability, 433>985>973.

Modifications to the SMC paste system can also have a dramatic effect by enhancing or detracting from the ability of the paste to penetrate the bundles. Changing the monomer level, paste viscosity, and resin composition can all change the ability of the paste to wet out the strand. Also, the addition of modifying agents such as BYK W9010, W995, and W996 from BYK Chemie can dramatically improve the wet out of an SMC system. In addition, the rate of dissolution reduces the time to fill the mold in the compound inherent shear viscosity. The molding process time and temperature are optimized with the catalyst for flow without resin degradation to reduce mold cycle time.

As discussed previously herein, conventional formulations for sheet molding compounds use one or more rapidly thickening, high peak viscosity level alkaline earth oxides such as magnesium oxide, magnesium hydroxide, or calcium oxide to achieve a tack free sheet that is capable of being molded in 2 to 3 days with a viscosity of greater than twenty million centipoises. Although this technology is industrially viable and repeatable, it has certain limitations. First, the viscosity of 20 million centipoises or greater typically requires a molding pressure of 1000 psi or greater and at least 500 psi with the addition of additives such as fumed silica or polymer flow enhancing additives to increase flow at higher viscosities. However, the inventive composition is superior to these conventional formulations. In particular, the inventive sheet molding composition uses a combination of two thickening elements, e.g., calcium hydroxide and zinc oxide, which thicken the SMC paste more slowly and to a lower peak level than an adequate amount of traditional thickeners. At this reduced viscosity level (e.g., 1 to 10 million centipoises), the SMC paste is not tacky to the touch.

This reduced viscosity provides several benefits. First, reduced viscosity means that the part to be molded can be molded with less pressure than the standard thickened part. Second, larger parts can be molded with the same press capacity due to a more efficient use of the pressure required to flow the SMC. In addition, the SMC can be molded in thinner profiles for lower cost parts due to the modified rheology of the SMC paste thickened by this system.

As one example of the reduction in cost caused by the inventive SMC, the SMC of the present invention was used to mold parts for a bus. By using the sheet molding compound of the present invention, manufacturers were able to save 75% of the cost of tooling and presses versus a conventional system using conventional SMC. In addition, the manufacturers were able to save 25% over the equipment cost of a competitive resin transfer molding system, thus affording dramatic improvements in the emissions of organic volatiles versus a competitive hand lay up system.

Additionally, the sheet molding compound of the present invention can carry glass evenly through the entire profile of the part whereas a traditionally thickened system of the same viscosity might fill the part completely but leave higher levels of glass reinforcement in the location of the charge (i.e., where the SMC is placed in the mold prior to closing the mold). Moreover, conventional SMC has a viscosity which inhibits the flow of SMC so that the mold is not filled evenly and there is little or no glass at the edge of the part that may be visible in the finished part.

The addition of divinyl benzene as a portion of the monomer system for the inventive SMC will toughen the part, thereby allowing improved impact resistance in thinner profiles. Additionally, due to the reduced initial viscosity and slower thickening profile, the ability of the new system to wet or solvate the reinforcing fibers is dramatically increased, which leads to improved pigmentability, improved impact, shear and tensile strength, and a general uniform reinforcement of the over all of the molded part.

Having generally described this invention, a further understanding can be obtained by reference to certain specific examples illustrated below which are provided for purposes of illustration only and are not intended to be all inclusive or limiting unless otherwise specified.

EXAMPLES

As one example of the use of the inventive sheet molding compound, SMC doors for domestic residences are typically manufactured by molding a skin of SMC composite material. Generally, this skin is molded at 300° F. and at 1000 psi for 50 seconds per skin. The conventional sheet molding compound used to make this skin has a shelf life of less than 10 days, resulting in a scrap rate of 1% of all of the SMC being manufactured being disposed of unmolded and an additional 1% scrapping of molded parts due to defects. By utilizing the SMC of the present invention, a manufacturer is able to obtain at least a 30 day shelf life for unmolded SMC and can eliminate unmolded scrap from their overhead cost. In addition, the molded scrap due to defects is reduced by at least 0.75%.

In a further example of the use of the inventive sheet molding compound, SMC formulations as described in Tables 1–3 have demonstrated improved moldable shelf life of up to 30 days, as opposed to less than 10 days for conventionally thickened SMC predecessors. Also, these formulations were capable of molding a door skin with a thickness of 0.065 inches compared to a minimal 0.07 inch thickness for the convention system. Molded part defects were reduced by 1% from 7% to 6% due to reduction in non-filled parts, cracking and blistering.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A two-part low viscosity sheet molding compound comprising:

an A-side premix including:
40–100 parts per hundred resin of a thermosetting resin selected from the group consisting of a polyester thermosetting resin and a vinylester thermosetting resin;
0.25–10 parts per hundred resin of a free radical generating catalyst;
100–300 parts per hundred resin of a filler material;
0–20 parts per hundred resin of divinyl benzene;
0–60 parts per hundred resin of a thermoplastic low shrink additive; and
a first portion of a mold release agent; and
a B-side premix including:
0.1–10 parts per hundred resin of zinc oxide;
0.1–10 parts per hundred resin of calcium hydroxide;
0–20 parts per hundred resin of a pigment;
0–1 part per hundred resin of an inhibitor matched for storage and molding temperature; and
a second portion of said mold release agent;
wherein said A-side premix and said B-side premix are stored separately and are combined before compounding said sheet molding compound; and
wherein said first and second portion of said mold release agent results in an addition of 1–20 parts per hundred resin of said mold release agent in said sheet molding compound.

2. The sheet molding compound of claim 1, wherein said calcium hydroxide is present in said B-side premix in an amount of from 1–5 parts per hundred resin.

3. The sheet molding compound of claim 1, wherein said zinc oxide is present in said B-side premix in an amount of from 1–5 parts per hundred resin.

4. The sheet molding compound according to claim 1, wherein said pigment is selected from the group consisting of titanium dioxide, ferrous oxide, ferric oxide, carbon, zinc sulfite, lead and phthalo compounds.

5. The sheet molding compound according to claim 4, wherein said pigment is dispersed in a non-thermosetting carrier resin.

6. The sheet molding compound according to claim 1, wherein said mold release agent is selected from the group consisting of zinc stearate, calcium stearate and stearic acid.

7. The sheet molding compound according to claim 1, wherein said inhibitor is selected from the group consisting of parabenzoquinone (PBQ), hydroquinone (HQ), toluhydroquinone (THQ), tert butyl hydroxyanisol (BHA) and butylated hydroxytoluene (BHT).

8. The sheet molding compound according to claim 1, wherein said sheet molding compound has a shelf life of 30 to 90 days.

9. The sheet molding compound according to claim 1, wherein said sheet molding compound has a low viscosity of from 1 million to 10 million centipoises.

10. The sheet molding compound according to claim 9, wherein said sheet molding compound has an improved ability to saturate the reinforcement.

11. The sheet molding compound according to claim 9, wherein said low viscosity is maintained for a period of time sufficient to form molded components with minimal defects and reduced thickness.

12. The sheet molding compound according to claim 11, wherein said low viscosity increases the flow of said sheet molding compound to enable large complex parts to be molded at a reduced pressure.

13. The sheet molding compound according to claim 9, wherein said sheet molding compound is capable of being molded in a low pressure compression molding process at a pressure of from 100 to 2000 psi.

14. The sheet molding compound according to claim 9, wherein said sheet molding compound has reduced tack.

15. The sheet molding compound according to claim 9, wherein said sheet molding compound carries glass evenly so that a part molded with said sheet molding compound has an even distribution of glass in said molded part.

16. A method of forming a low viscosity, tack free sheet molding compound comprising the steps of:
    admixing 40–100 parts per hundred resin of a thermosetting resin selected from the group consisting of a polyester resin and a vinyl ester resin, 0.25–10 parts per hundred resin of a free radical generating catalyst, and a first portion of a mold release agent to form an A-side premix;
    admixing 1–10 parts per hundred resin of zinc oxide, 1–10 parts per hundred resin of calcium hydroxide, and a second portion of said mold release agent to form a B-side premix; and
    combining said A-side premix and said B-side premix before compounding said sheet molding compound;
    wherein said first and second portion of said mold release agent results in an addition of 1–20 parts per hundred resin of said mold release agent to said sheet molding compound.

17. The method of claim 16, further comprising adding at least one member selected from the group consisting of a thermoplastic low shrink additive in an amount of up to 60 parts per hundred resin and divinyl benzene in an amount of up to 20 parts per hundred resin to said A-side premix.

18. The method of claim 17, further comprising adding at least one member selected from the group consisting of a pigment in an amount of up to 20 parts per hundred resin and an inhibitor in an amount of up to 1 part per hundred resin to said B-side premix.

19. The method of claim 16, further comprising adding at least one member selected from the group consisting of a pigment in an amount of up to 20 parts per hundred resin and an inhibitor in an amount of up to 1 part per hundred resin to said B-side premix.

20. The method of claim 19, wherein said pigment is selected from the group consisting of titanium dioxide, ferrous oxide, ferric oxide, carbon, zinc sulfite, lead and phthalo compounds.

21. The method of claim 19, wherein said inhibitor is selected from the group consisting of parabenzoquinone (PBQ), hydroquinone (HQ), toluhydroquinone (THQ), tert butyl hydroxyanisol (BHA) and butylated hydroxytoluene (BHT).

22. The method of claim 16, wherein said mold release agent is selected from the group consisting of zinc stearate, calcium stearate and stearic acid.

23. A method of forming a molded component part comprising the steps of:
    admixing 40–100 parts per hundred resin of a thermosetting resin selected from the group consisting of a polyester resin and a vinylester resin, 0.25–10 parts per hundred resin of a free radical generating catalyst, a thermoplastic low shrink additive in an amount of 0–60 parts per hundred resin, divinyl benzene in an amount of 0–20 parts per hundred resin, and a first portion of a mold release agent to form an A-side premix;
    admixing 1–10 parts per hundred resin of zinc oxide, 1–10 parts per hundred resin of calcium hydroxide, a pigment in an amount of 0–20 parts per hundred resin, an inhibitor in an amount of 0–1 part per hundred resin, and a second portion of said mold release agent to form a B-side premix;
    combining said A-side premix and said B-side premix to form a sheet molding compound having reduced viscosity; and placing said sheet molding compound on a mold; and
    curing said sheet molding compound on said mold at a low pressure;
    wherein said first and second portion of said mold release agent results in an addition of 1–20 parts per hundred resin of said mold release agent to said sheet molding compound.

24. The method of claim 23, wherein said reduced viscosity increases the flow of said sheet molding compound to enable large complex parts to be molded.

25. The method of claim 23, wherein said reduced viscosity is from 1 million to 10 million centipoises.

26. The method of claim 23, wherein said reduced viscosity is maintained for a period of time sufficient to form said molded component part with minimal defects and reduced thickness.

27. The method of claim 23, wherein said sheet molding compound has a shelf life of 30 to 90 days.

28. The method of claim 23, wherein said pigment is dispersed in a non-thermosetting carrier resin.

29. The method of claim 23, wherein said mold release agent is selected from the group consisting of zinc stearate, calcium stearate and stearic acid.

30. The method of claim 23, wherein said inhibitor is selected from the group consisting of parabenzoquinone (PBQ), hydroquinone (HQ), toluhydroquinone (THQ), tert butyl hydroxyanisol (BHA) and butylated hydroxytoluene (BHT).

* * * * *